No. 663,901. Patented Dec. 18, 1900.
H. A. HOUSEMAN.
STRAIGHT KNITTING MACHINE.
(Application filed July 5, 1900.)
(No Model.) 11 Sheets—Sheet 1.
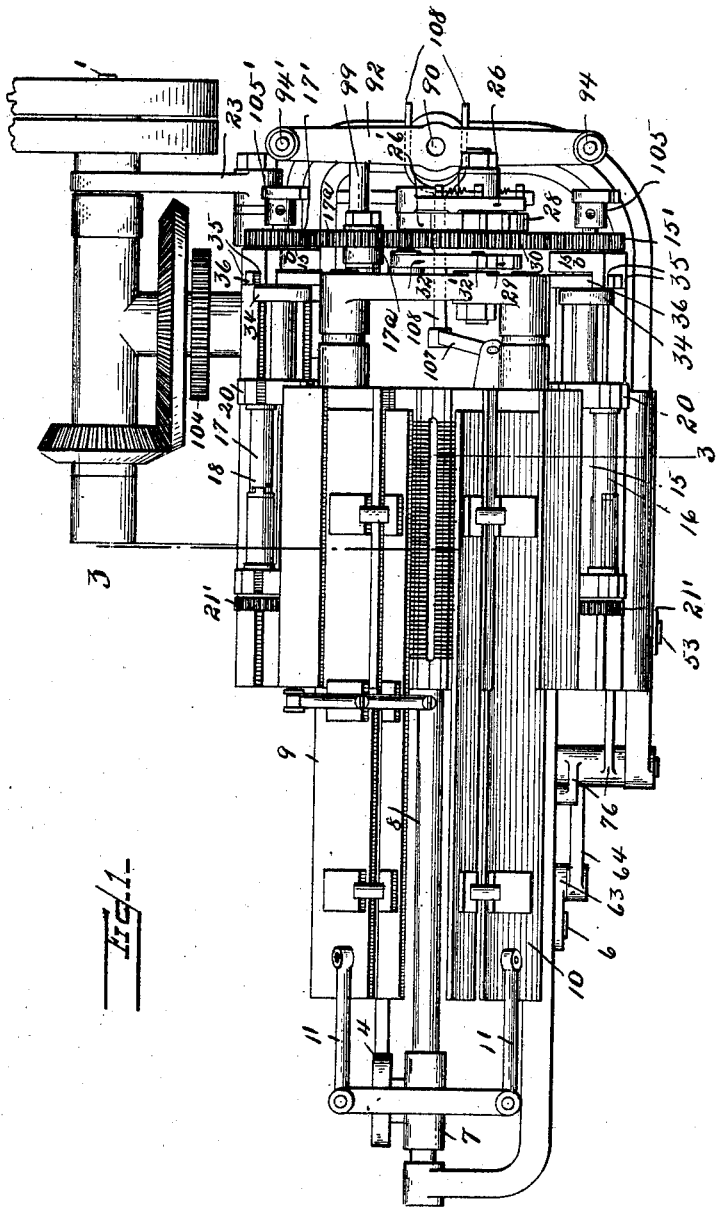
WITNESSES:
INVENTOR
Harry A. Houseman
BY
Harding and Harding
ATTORNEYS.

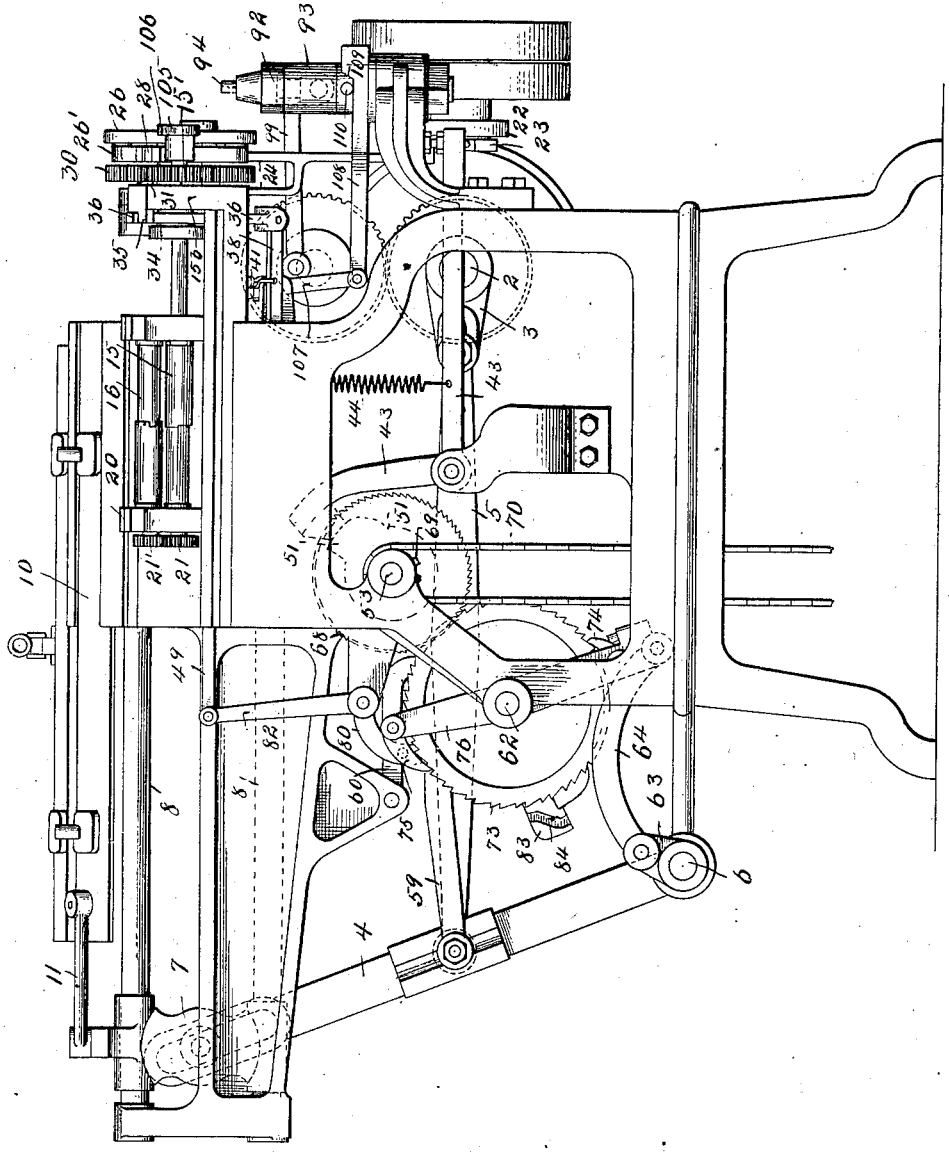

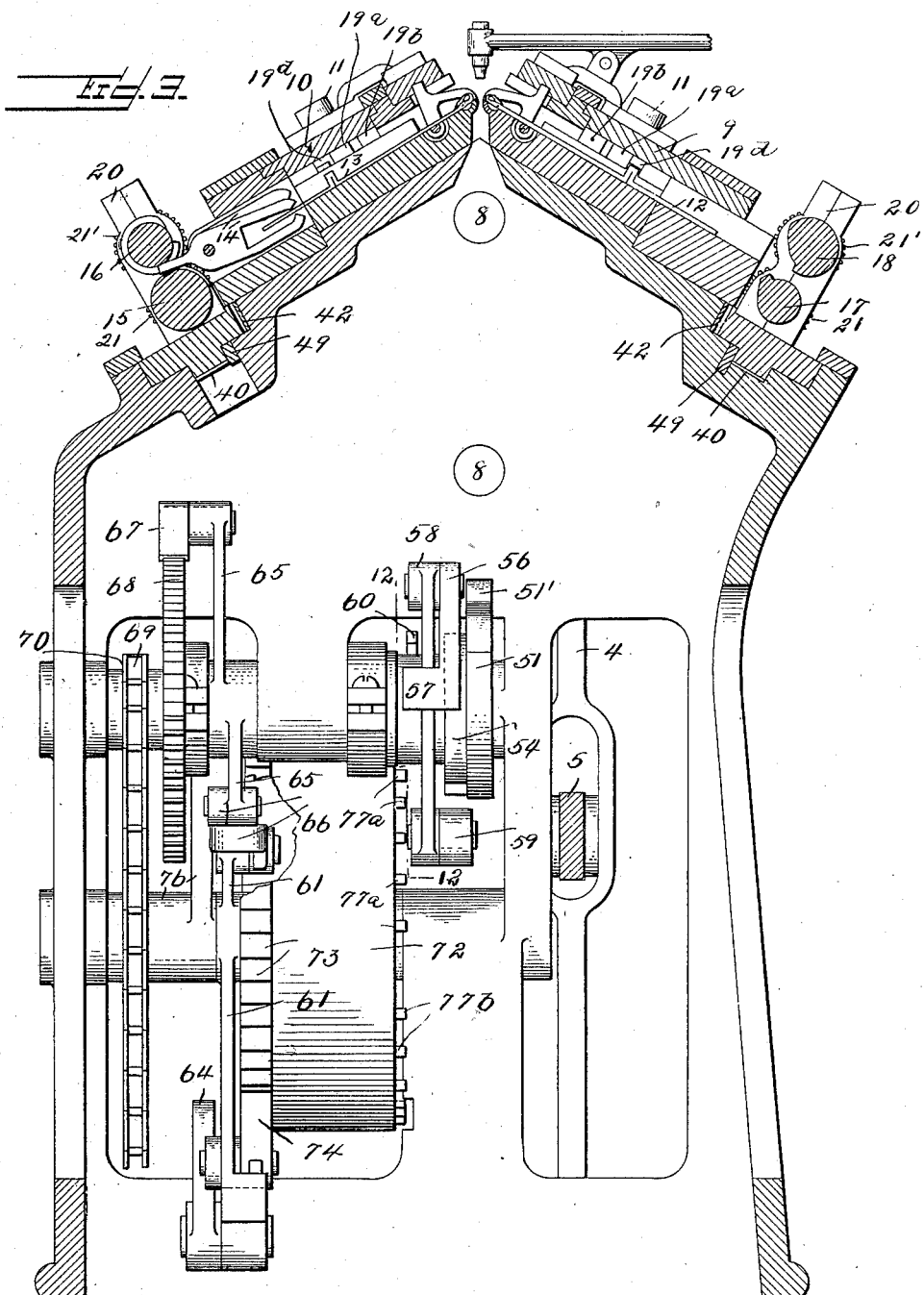

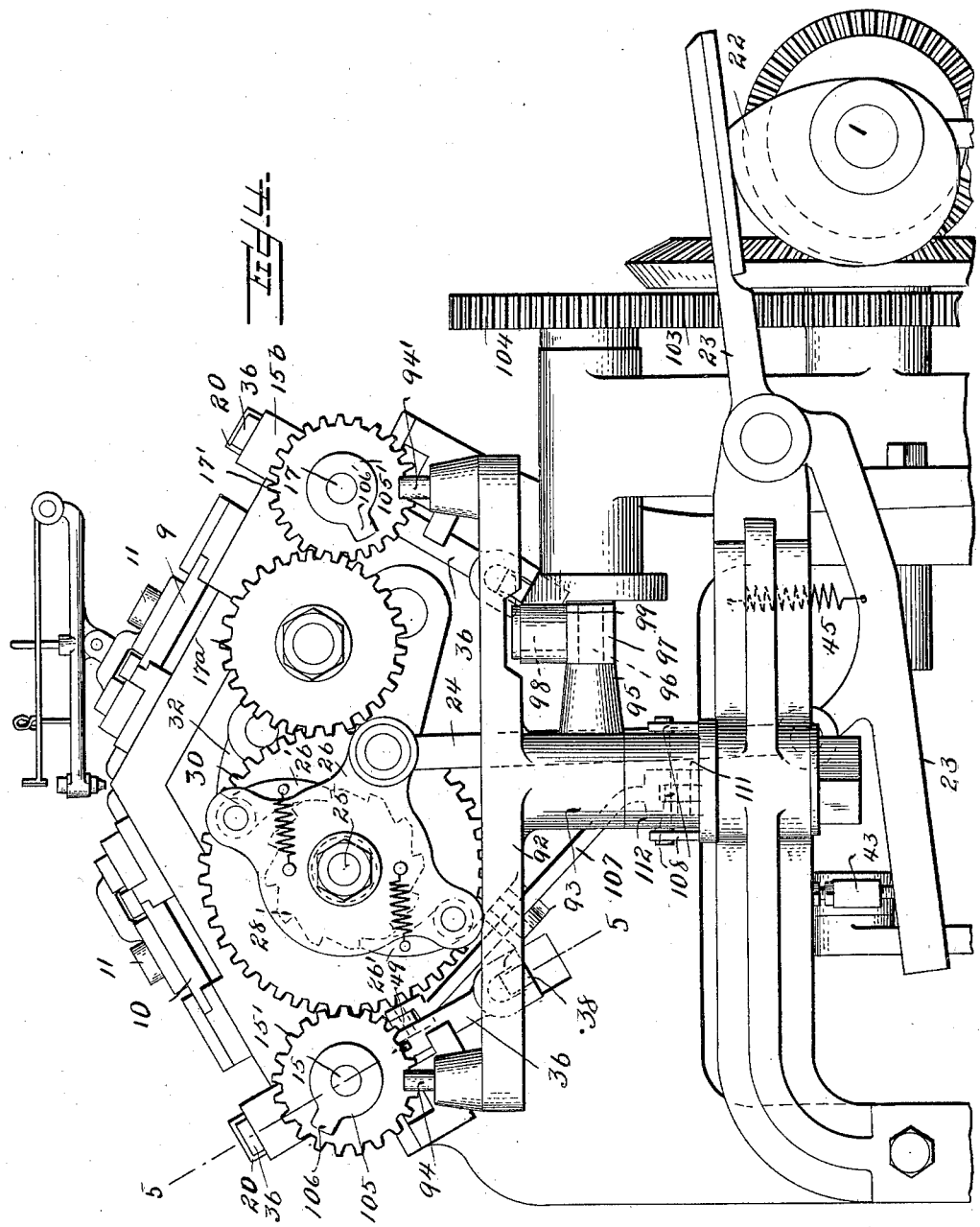

No. 663,901.  
H. A. HOUSEMAN.  
STRAIGHT KNITTING MACHINE.  
(Application filed July 5, 1900.)

(No Model.)

Patented Dec. 18, 1900.

11 Sheets—Sheet 5.

WITNESSES:  
Jesse B. Heller.  
J. W. Shindler Jr.

INVENTOR  
Harry A. Houseman  
BY  
Harding and Harding  
ATTORNEYS.

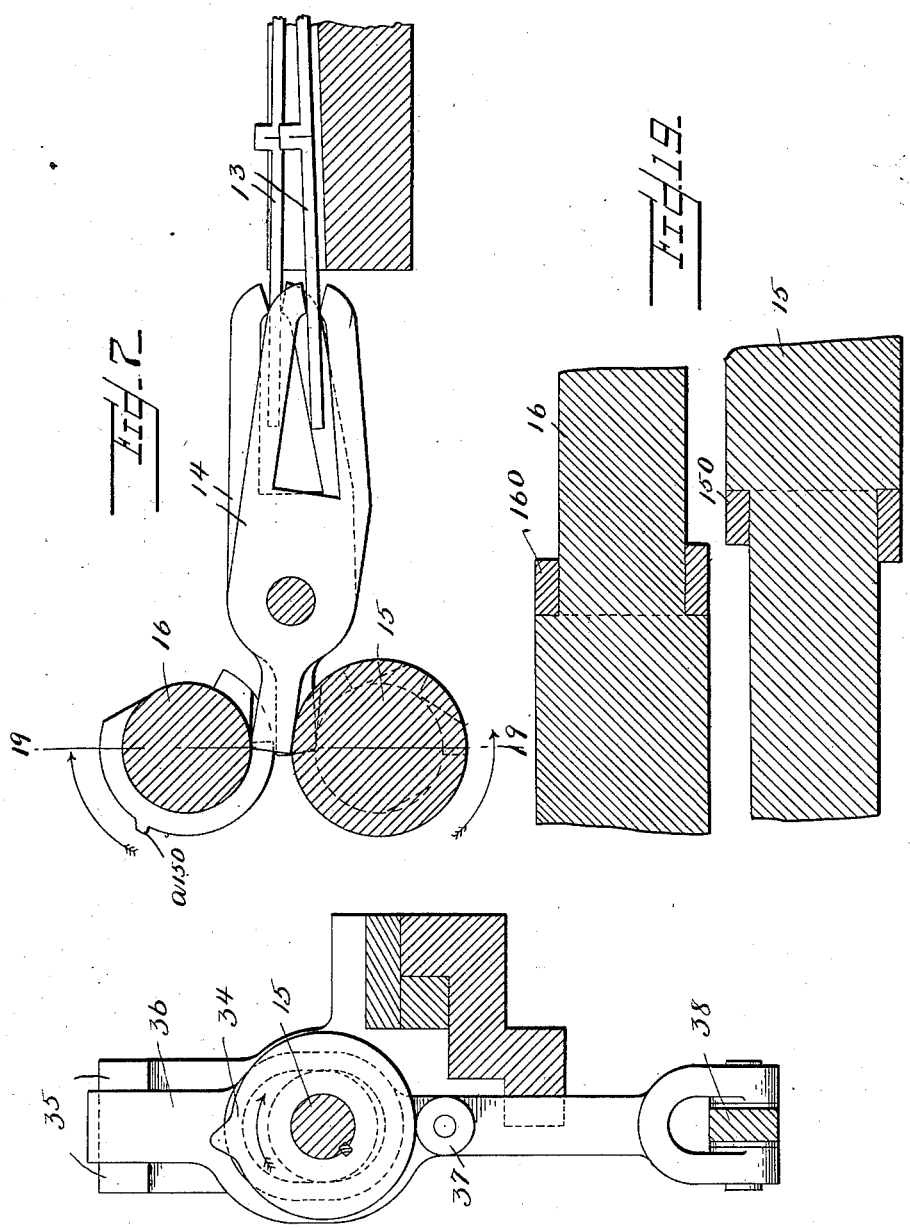

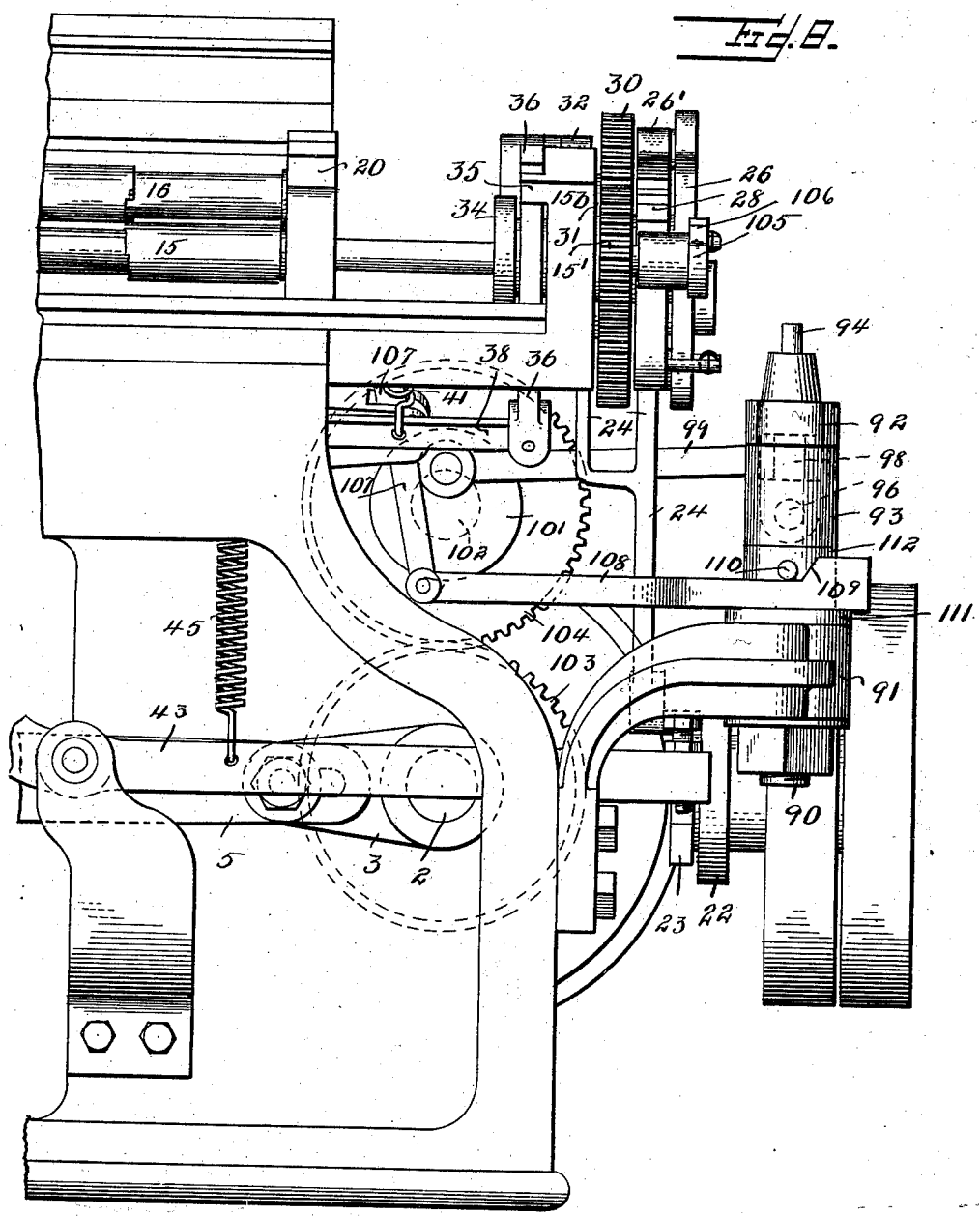

No. 663,901. Patented Dec. 18, 1900.
H. A. HOUSEMAN.
STRAIGHT KNITTING MACHINE.
(Application filed July 5, 1900.)
(No Model.) 11 Sheets—Sheet 8.
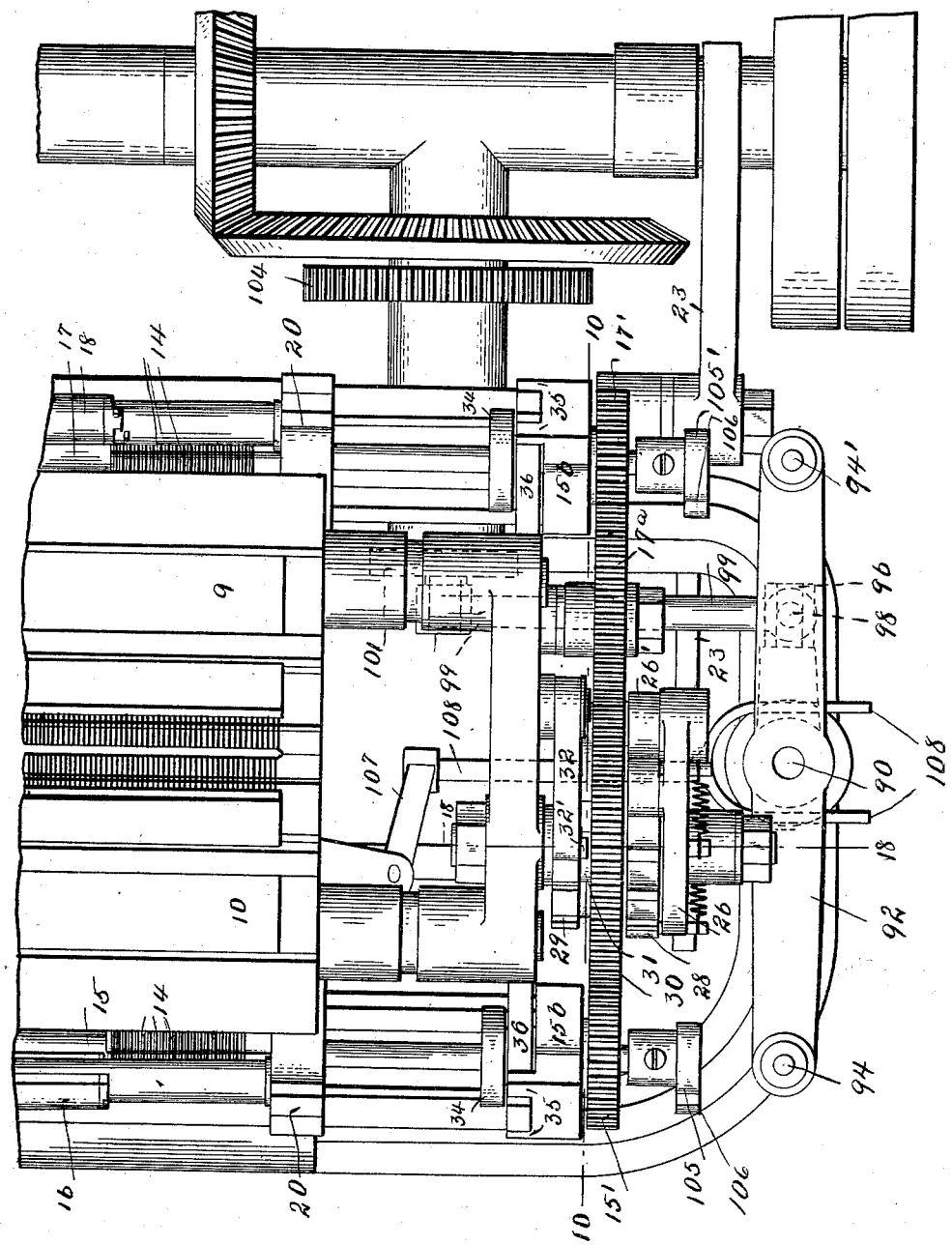
WITNESSES:
Jesse B. Heller
J. M. Shindler Jr.
INVENTOR
Harry A. Houseman
BY
Harding and Harding
ATTORNEYS No. 663,901. Patented Dec. 18, 1900.
H. A. HOUSEMAN.
STRAIGHT KNITTING MACHINE.
(Application filed July 5, 1900.)
(No Model.) 11 Sheets—Sheet 9.
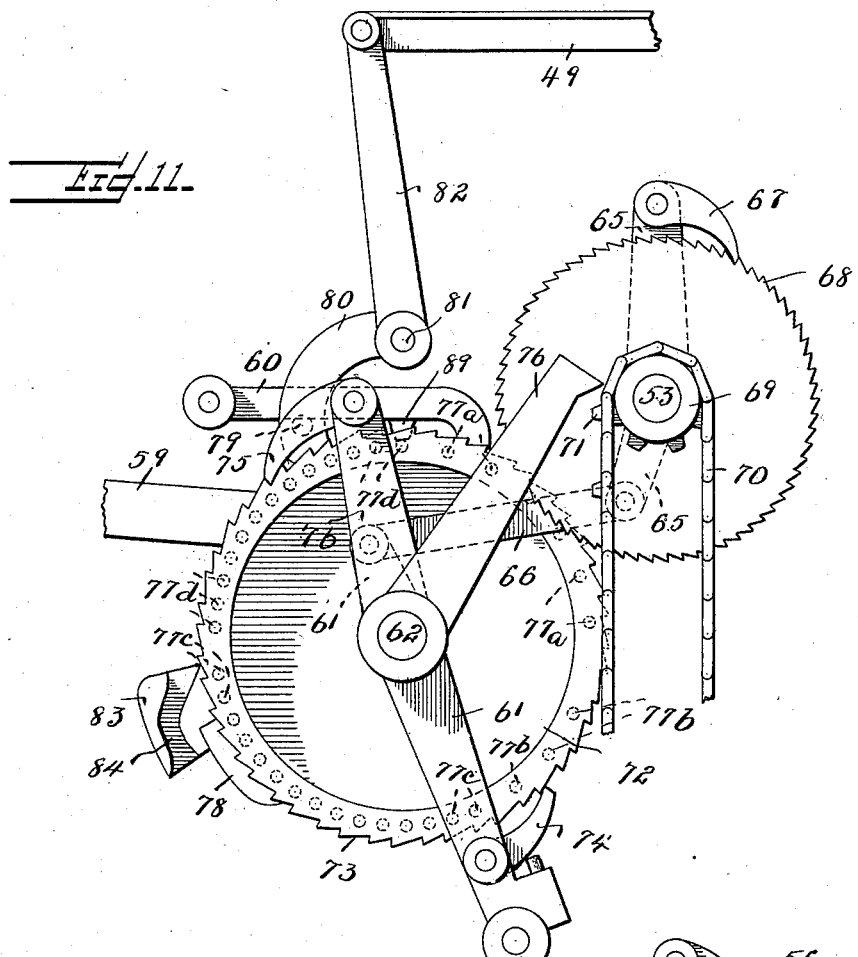
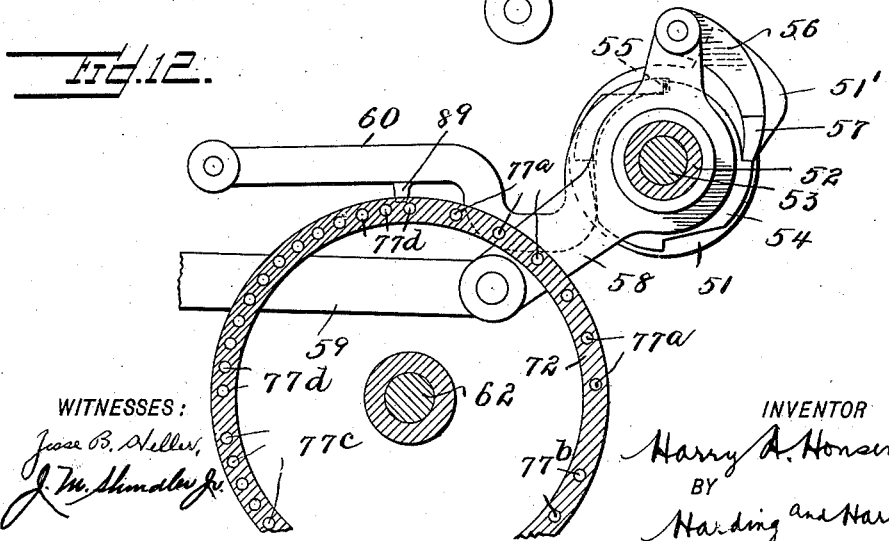

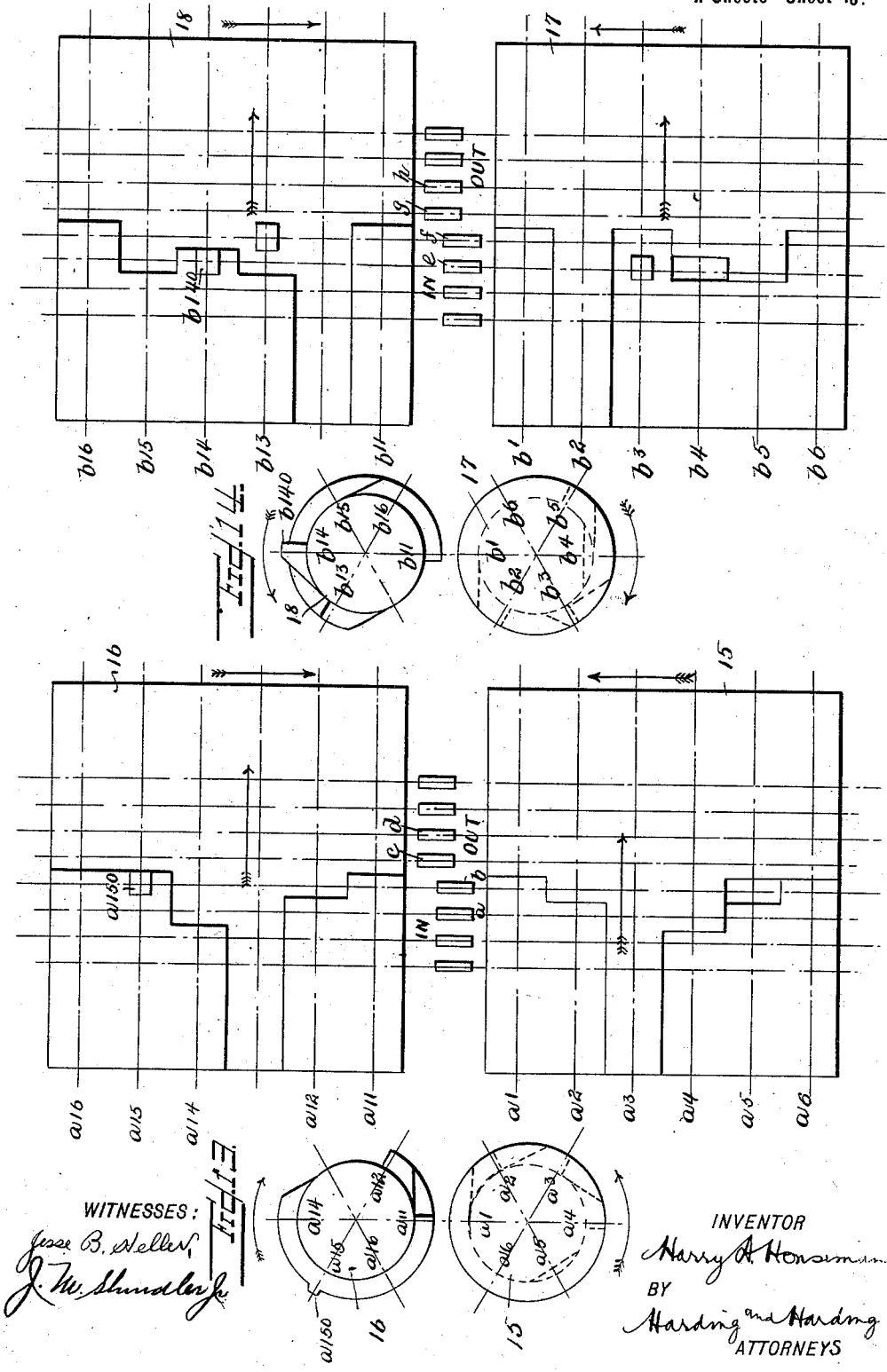

No. 663,901. Patented Dec. 18, 1900.
H. A. HOUSEMAN.
STRAIGHT KNITTING MACHINE.
(Application filed July 5, 1900.)
(No Model.) 11 Sheets—Sheet 11.
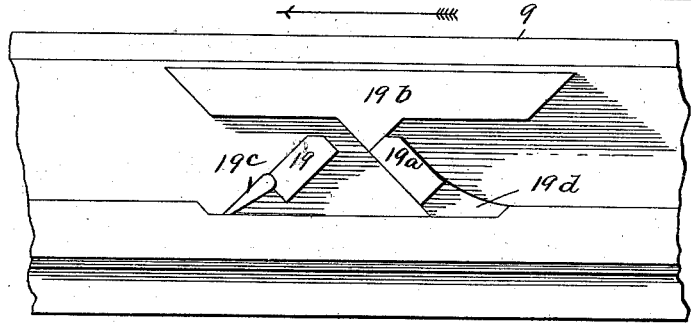
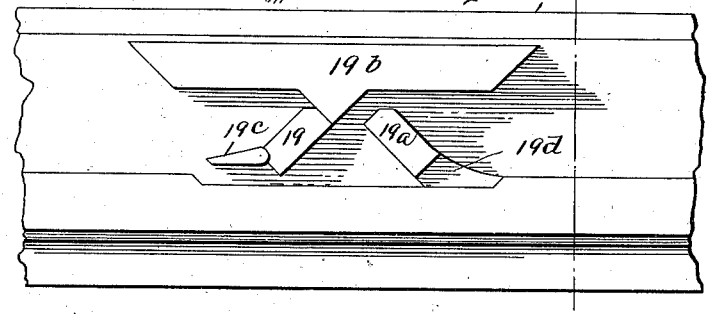
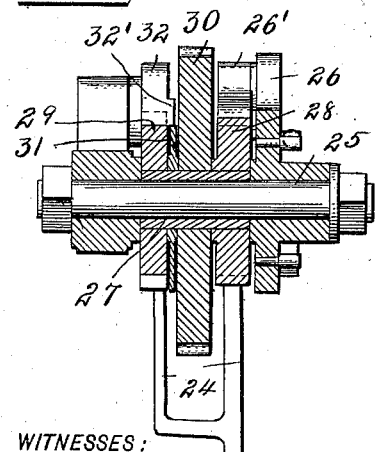
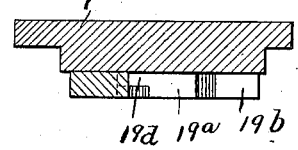
WITNESSES:
Jesse B. Heller
J. M. Shindley Jr.
INVENTOR
Harry A. Houseman
BY
Harding and Harding
ATTORNEYS

UNITED STATES PATENT OFFICE.

HARRY A. HOUSEMAN, OF PHILADELPHIA, PENNSYLVANIA, ASSIGNOR TO THE STANDARD MACHINE COMPANY, OF PENNSYLVANIA.

STRAIGHT-KNITTING MACHINE.

SPECIFICATION forming part of Letters Patent No. 663,901, dated December 18, 1900.

Application filed July 5, 1900. Serial No. 22,523. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Straight-Knitting Machines, of which the following is a full, clear, and exact description, reference being had to the accompanying drawings, which form a part of this specification.

My invention relates to straight-knitting machines, and more particularly to machines for knitting fashioned tubular goods.

My object is to improve the construction and operation of the machine shown, described, and claimed in the application filed by me March 30, 1900, Serial No. 8,427.

To this end my invention consists in novel means for imparting to the pattern-rolls (which through the needle-levers throw the fashioning-needles into and out of operation) the required movement of rotation, in novel means for throwing the pattern-roll-operating means out of operation, and in novel means for returning the rolls to their initial position after the desired length of widened fabric has been knit.

Figure 10:
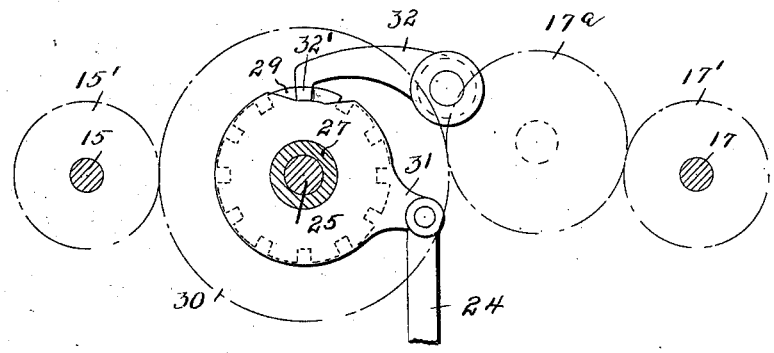
Figure 5:
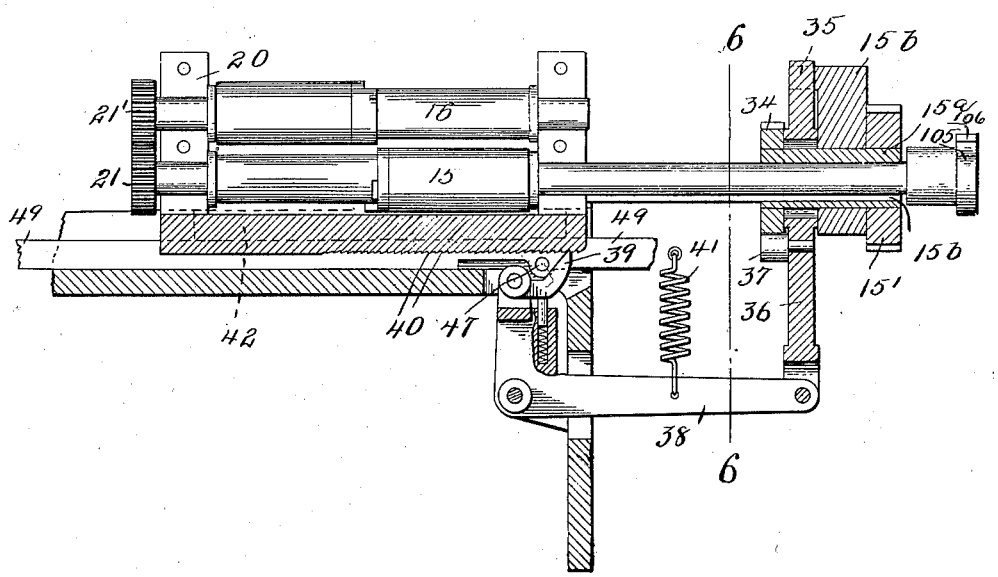

Figure 1 is a plan view. Fig. 2 is a side elevation. Fig. 3 is a transverse section on the line 3 3 of Fig. 1. Fig. 4 is a partial end view. Fig. 5 is a detail section on the line 5 5 of Fig. 4, showing the pattern-rolls and mechanism for directly actuating the same. Fig. 6 is a section on the line 6 6 of Fig. 5. Fig. 7 is an enlarged detail sectional view of the needle-lever-controlling rolls, a needle, and a portion of the needle-bed. Fig. 8 is an enlarged side elevation of a portion of the machine comprising the mechanism shown in Fig. 5. Fig. 9 is an enlarged plan view of the mechanism shown in Fig. 8. Fig. 10 is a section on the line 10 10 of Fig. 9. Fig. 11 is a side elevation of the pattern-cylinder and its controlling mechanism. Fig. 12 is a detail section on the line 12 12 of Fig. 3. Fig. 13 is a diagram of the fashioning-needle-controlling rolls for the front bank of needles. Fig. 14 is a diagram of the fashioning-needle-controller rolls for the rear bank of needles. Fig. 15 is a plan view of one of the cam-plates and the knitting-cam, showing the cams as they are when knitting with a full bank of needles. Fig. 16 is a plan view of the same when one needle of the bank is knitting with the needles of the other bank. Fig. 17 is a section on line 17 17, Fig. 16. Fig. 18 is a partial section on the line 18 18 of Fig. 9. Fig. 19 is a section through the rolls on line 19 19, Fig. 7.

1 is the main driving-shaft, and 2 the crank-shaft driven thereby through the medium of the bevel-gears.

3 is the crank, and 4 the rocking lever, which is connected to crank 3 by means of connecting-rod 5. The rocking lever 4 is connected at one end to the shaft 6 and at the other end to the cross-head 7, which reciprocates on the rods 8.

9 and 10 are the knitting-cam plates, which are connected to the cross-head 7 by means of the links 11.

12 and 13 are the needles. The needles 12 are the regular needles used on every round of knitting, and 13 are the fashioning-needles. The needles 13 are raised into and out of alinement with the knitting-cams by means of the pivoted needle-levers 14. The needle-levers of the front bank are controlled by the rolls 15 and 16, while the needle-levers of the rear bank are controlled by the rolls 17 and 18. These two pairs of rolls have a longitudinal movement and a rotary movement, the longitudinal movement setting the rolls to control additional fashioning-needles one at a time and the rotation of the rolls dictating the fashioning-needles to be thrown into and out of action at each reciprocation in order to make the cross-stitching to close up the hole produced by the throwing in of an additional needle, the operation broadly being the same as that described in the specification of Frank Wilcomb, Serial No. 712,976, filed April 14, 1899, and specifically the same as that described in my application, Serial No. 8,427. The construction of these rolls does not differ materially from those set out in my prior application and their operation and the method by which they control the fashioning-needle levers are the same. They will first be described and afterward the improved actuating mechanism for imparting to the rolls the described movements.

Referring now to Figs. 7, 13, and 14, 15 is the lower roll, and 16 the upper roll, of the pair of rolls for controlling the front bank of fashioning-needles, and 17 is the lower roll, and 18 the upper roll, of the pair of rolls for controlling the rear bank of fashioning-needles. Each roll is provided with projections and depressions of varying longitudinal extent, the projections on one roll registering with the depressions on the other roll, as and for the purpose set forth in my prior application. The specific way shown in the drawings of forming such projections and depressions, however, is somewhat different. I make about one half of each roll of greater diameter than the other half. On the part of lesser diameter I then secure a projection along the section, if any, which it is desired should be raised above the remaining depressed sections. On the part of greater diameter I provide a groove along the section, if any, which it is desired should be depressed below the remaining raised sections. If desired, I may make the central part of each roll, where the raised and depressed portions are most irregularly arranged, as a separate collar, (designated 150 160, Fig. 19.) Inasmuch as the rolls are given a step-by-step rotation, I have on the drawings in Figs. 13 and 14 shown the projecting or raised parts of the rolls, even where they are solid, as divided into longitudinal sections corresponding to the number of turns which it is necessary to make to impart to the roll a complete movement of rotation. The number of turns or stops of the rolls necessary to be made will of course vary with the pattern. In the present case, as in my previous application, the pattern is such that six turns or steps of the rolls are most convenient to produce the stitch desired. Accordingly the roll 15 is shown as provided with six projections or raised sections $a'$ $a^2$ $a^3$ $a^4$ $a^5$ $a^6$, extending longitudinally on its periphery and of varying length, while the roll 16 has five raised sections $a^{11}$ $a^{12}$ $a^{14}$ $a^{15}$ $a^{16}$ of the same character. These raised sections impart to the needle-levers the necessary pivotal movement to bring them into and out of alinement with the knitting-cams. The two rolls rotate in unison in opposite directions, so that raised section $a'$, for example, will at one point in the rotation of the rolls aline with raised section $a^{11}$—that is, each of these two raised sections will register with the depressed section alining with other raised section. In this way raised section $a^2$ alines with raised section $a^{12}$, $a^4$ with $a^{14}$, $a^5$ with $a^{15}$, and $a^6$ with $a^{16}$. The projecting raised portion $a^{150}$ of section $a^{15}$ of upper roll 16 is higher than the other raised portions in order to tilt the single needle-lever which at any one time it controls a sufficient distance to throw the corresponding needle into alinement with the knitting-cam plate 10, so that this needle will knit with the rear bank of needles. 17 is the lower roll, and 18 the upper roll, of the pair of rolls for controlling the rear bank of fashioning-needles. The roll 17 is provided with six raised sections $b'$ $b^2$ $b^3$ $b^4$ $b^5$ $b^6$ and the roll 18 with five raised sections $b^{11}$ $b^{13}$ $b^{14}$ $b^{15}$ $b^{16}$, these being of the same character as those upon the rolls 15 and 16, the projecting portion $b^{140}$ of section $b^{14}$ being higher than the other raised portions. The raised section $b'$ in the rotation of the rolls alines with the raised section $b^{11}$, $b^3$ with $b^{13}$, $b^4$ with $b^{14}$, $b^5$ with $b^{15}$, and $b^6$ with $b^{16}$, in the same manner as on the pair of rolls 15 and 16. The operation of these rolls—the way in which they act to throw in and out additional fashioning-needles as desired—does not differ from that of my prior application and is as follows, although it will be understood that these needles may be actuated in any other predetermined way by a different form and arrangement of projections on the rolls:

Assuming the rolls to be in the position shown in Figs. 7, 13, and 14, the raised sections $a^{11}$ and $b^{11}$ have thrown four of the needles of each bank into action, while the raised sections $a'$ and $b'$ are holding four of the needles of each bank out of action. The thread-carrier and the knitting-cams now travel from right to left, knitting on the rear bank of needles. At the end of this throw the rolls are rotated a one-sixth turn, so that raised sections $a^2$ and $a^{12}$ are in contact with the needle-levers of the front bank and raised section $b^2$ is in contact with the needle-levers of the rear bank. This described rotation of the rolls 15 and 16 will throw the needle-lever marked $b$, Fig. 13, out of action, and rolls 17 and 18 will throw all the needles of the rear bank out of action—that is, throw all of the fashioning-needles on a common level—so as to permit of the subsequent longitudinal shifting of the rolls. The thread now travels from left to right, knitting on the front bank of needles, and the rolls controlling the rear bank of needles are shifted longitudinally in the direction of the arrow $a$ distance equal to the distance between needles. Both pairs of rolls are now rotated another one-sixth turn, bringing raised section $a^3$ in contact with the needle-levers of the front bank and raised sections $b^3$ and $b^{13}$ in contact with the needle-levers of the rear bank. This described rotation of the rolls 15 and 16 will throw all the needles of the front bank out of action—that is, throw all the fashioning-needles on a common level—so as to permit of the subsequent longitudinal shifting of the rolls, and the rolls 17 and 18 will throw needle-lever $g$ into action and lever $f$ out of action, Fig. 14. The thread-carrier now travels from right to left, knitting on the rear bank of needles, and the rolls controlling the front bank are shifted longitudinally in the direction of the arrow $a$ distance equal to the distance between needles. Both pairs of rolls are now given another one-sixth turn, bringing raised sections $a^4$ and $a^{14}$ in contact with the needle-levers of the front bank and raised sections $b^4$ and $b^{14}$ in contact with the needle-levers of the rear bank. This will keep needle-lever $a$ in action and keep needle-lever $b$ out of action, and by means of high point $b^{140}$ will throw needle-lever $f$ of the rear bank into action, so as to cross the thread from the front bank of needles to the rear bank and so that the corresponding needle will knit with the front bank of needles. The thread-carrier now travels from left to right, knitting on the front bank of needles and needle $f$ of the rear bank. Both pairs of rolls are now given another one-sixth turn, bringing raised sections $a^5$ and $a^{15}$ and high point $a^{150}$ in contact with the needle-levers of the front bank and raised sections $b^5$ and $b^{15}$ in contact with the needle-levers of the rear bank. This will throw needle-lever $f$ out of action and maintain in action needle-lever $e$ and will throw needle-lever $c$ of the front bank into action, so as to cross the thread from the rear bank to the front bank and so that the corresponding needle will knit with the rear bank of needles. The thread-carrier now travels from right to left, knitting on the rear bank and needle $c$ of the front bank. Both pairs of rolls are now given another one-sixth turn, bringing raised sections $a^6$ and $a^{16}$ in contact with the needle-levers of the rear bank. This will maintain in action needle-lever $c$ of the front bank. The thread-carrier now travels from left to right, knitting on the front bank. The pairs are now given another one-sixth turn, returning all the rolls to their initial position. So long as the rolls are held in this position five needles, including needle $c$ of the front bank, and five needles, including needle $g$ of the rear bank, will be in action. When another needle is to be thrown into action, the rolls will be again rotated and shifted longitudinally one point, as before described.

I shall now describe the mechanism for actuating the rolls.

The rolls are journaled in a frame or slide 20, each of the rolls 15 and 17 being directly actuated and geared, respectively, to the rolls 16 and 18, as hereinafter described. On the main driving-shaft is the cam 22.

23 is a rocking lever pivoted between its ends to the frame of the machine and having one end in line of travel of the cam, against which it is held by spring 45, and having pivoted to it near its other end the link 24, which at its other end is bifurcated, one arm being pivoted to the pawl-carrier 26, loose on the stationary shaft 25. This shaft 25 also has the loose sleeve 27, to which is secured a ratchet-wheel 28 having twelve teeth, a locking-wheel 29 having twelve indents, and a gear-wheel 30. Loose upon the sleeve 27 and between the gear-wheel and the locking-wheel is a cam-plate 31, pivoted to the other arm of link 24. The pawl-carrier 26 is provided with two pawls 26' 26', which act upon the ratchet-wheel 28.

32 is a locking-dog pivoted to the machine-frame and adapted to engage the indents in locking-wheel 29 and having a lateral projection 32' in line of movement of the cam-plate 31.

The operation of the parts just described is as follows: At each revolution of the main shaft the lever 23 and link 24 and pawl-carrier 26 are oscillated, causing the pawls 26' 26', on the return movement of pawl-carrier 26, to engage the ratchet-wheel 28 and turn it, together with locking-wheel 29 and gear-wheel 30, a one-twelfth turn. At the end of each one-twelfth rotation of these wheels the locking-dog 32 drops into an indent in locking-wheel 29, thus preventing the ratchet-wheel 28 being carried by momentum beyond a one-twelfth turn. While the parts just described are stationary the lateral projection 32' of dog 32 rests on the low part of the periphery of cam-plate 31. During the backward movement of lever 24 the cam-plate 31 is turned to bring the high part of its periphery under the lateral projection 32' of dog 32, withdrawing the dog from engagement with the locking-wheel. During the forward movement of link 24 and during the racking forward of the ratchet-wheel 28, locking-wheel 29, and gear 30 the cam-plate 31 is turned in the opposite direction, which again brings its low part under the lateral projection 32' of dog 32, so that the latter is in position to engage the locking-wheel at the end of its forward turning movement.

The object of the foregoing mechanism is to impart to the gear 30 a one-twelfth turn at each rotation of the driving-shaft 1 and lock it from moving beyond a one-twelfth turn.

The gear 30 meshes directly with gear 15' on the shaft of roll 15. At the other side it meshes directly with gear $17^a$, which in turn meshes with gear 17' on the shaft of roll 17. The shaft of roll 15 also has the gear 21, which meshes with gear 21' on the shaft of roll 16, and the shaft of roll 17 is geared in a similar manner to the shaft of roll 18. The gear 30 is of twice the circumference of gears 15' and 17', so that with every one-twelfth turn of gear 30 a one-sixth turn is imparted to the rolls 15, 16, 17, and 18, as before described.

The gears 15' and 17' are not directly fastened to the roll-shafts, but are each secured to a sleeve $15^a$, journaled in a bearing $15^b$.

$15^c$ is a spline working in a groove in sleeve $15^a$, so as to connect the shaft of roll 15 with sleeve $15^a$, so that the shaft of the roll will rotate with the sleeve, but may move longitudinally independent of the sleeve.

I will now describe the mechanism for shifting the rolls 15 and 16 longitudinally at one point in the complete rotation of the rolls, as before described. This mechanism does not differ in detail from that described in my prior application. Secured to the sleeve $15^a$ is the cam 34. Sliding on the sleeve $15^a$ and between the projections 35 on the bearing $15^b$ is the bar 36, having the roller 37. The bar 36 is connected to one arm of the bell-crank 38, the other arm of this bell-crank carrying the pawl 39, working in the rack 40 on the slide 20. By referring to Figs. 5 and 6 it will be understood that when the raised part of the cam 34 strikes the roller 37 it will depress bar 36, turn bell-crank 38, and cause pawl 39 to advance the slide 20 the distance of one tooth.

41 is a spring for returning the bell-crank 38 and bar 36 to their normal position, bringing the pawl 39 back to engage the next tooth.

42 is a leaf-spring confined between the slide 20 and the frame of the machine, whereby the slide is held frictionally in its guideway except when it is shifted by the pawl 39.

The mechanism for shifting longitudinally rolls 17 and 18 is a duplicate of that just described for shifting rolls 15 and 16.

I provide the following means for holding the rolls stationary at any desired point during the fashioning and also before the fashioning is begun and after the fashioning is completed and it is desired to knit the tubular portions of uniform diameter.

51 is a cam having the high point 51'. This cam is on a sleeve 52 on the shaft 53. This sleeve also carries the four-toothed ratchet 54, the top of tooth 55 being concentric with the bottom of each of the other teeth.

56 is a pawl having the lug 57 and pivoted to the bell-crank 58, connected by means of the link 59 with the rocking lever 4.

60 is a pivoted guard-lever the upturned end of which is very slightly higher than the top of tooth 55. The pawl 56, being positively connected with the rocking lever 4, is being constantly reciprocated; but so long as the end of guard-lever 60 is elevated the pawl cannot engage the tooth 55, and the cam remains stationary. In this position the high point 51' of the cam 51 has lifted one end of pivoted lever 43, while the other end of lever 43 has engaged and depressed the free end of lever 23 and raised the end of lever 23 out of line of travel of cam 22. In this position the roll-turning mechanism is rendered inoperative. When it is desired to render the roll-turning mechanism operative, the guard-lever 60 is caused to be dropped by the pattern mechanism, to be hereinafter described, permitting the pawl 56 to engage the tooth 55, turning the cam a quarter-turn and withdrawing the high point 51' from under the lever 43. The spring 44 then acts to depress one end of lever 43 in contact with the concentric portion of cam 51 and to raise the other end of lever 43 away from lever 23, permitting it to be reciprocated by the cam 22, as before described. During the step-by-step rotation of the rolls the cam 51 and ratchet 54 are turned by the pawl 56 a complete revolution until the parts are again in the position shown in Figs. 11 and 12.

If it is desired that the rolls should rotate but once, the guard-lever 60 will have elevated immediately after the ratchet 54 has been given its first quarter-turn, so that it will be in a position to render the pawl ineffective after it has engaged the other three teeth of the ratchet 54, and thereby cause the lever 43 to be held against the concentric part of the cam a sufficient time to permit the roll-turning mechanism to give the rolls a complete rotation.

If it is desired that successive complete rotations should be given to the rolls, the guard-lever 60 remains depressed. Part of this mechanism is the same as that described in my prior application.

After all the fashioning-needles have been thrown into action and the required length of wide fabric has been knit and it is desired to throw all the fashioning-needles out of action, so as to start on the narrow goods, I provide the following mechanism for returning the rolls to their initial position:

90 is a post supported on bracket 91 on the machine-frame.

92 is a rocking lever having a sleeve 93 loose on the post 90.

94 94' are striking-pins on the ends of lever 92.

95 is a bracket on sleeve 93, having the pin 96. Surrounding this pin is a collar 97, having a projection 98.

99 is a connecting-rod the end of which surrounds projection 98, the other end of the rod being pivoted on crank-wheel 101 se the shaft 102, journaled in bearings on the machine-frame, and geared to shaft 2 by means of spur-gears 103 and 104. By this mechanism the rocking lever 92 is constantly reciprocated, there being one complete reciprocation to two throws of the pattern-rolls.

105 105' are collars secured to the shafts of rolls 15 and 17 and have lugs 106 106' projecting therefrom. When it is desired to return the rolls to their initial position, the rocking lever 92 through its sleeve 93 is elevated by suitably-timed automatic mechanism, to be hereinafter described, so that the striking-pins 94 94' will be in alinement with lugs 106 106' when the roller-shafts are turned to one of their six positions. In the case of rollers 15 and 16 the lug 106 on the shaft of roll 15 will be brought into line of travel of the striking-pin 94 after the raised section $a^3$ has engaged the needle-levers to move the fashioning-needles of the front bank out of action, and while the cam-cylinder is acting upon the needles of the rear bank the pin 94 strikes the lug 106, returning the roll-carrying frame or slide 20 and rolls 15 and 16 to their initial position. In the case of rollers 17 and 18 the lug 106' on the shaft of roll 17 will be brought into line of travel of the striking-pin 94' after the raised section $b^2$ has engaged the needle-levers to move the fashioning-needles of the rear bank out of action, and while the cam-cylinder is acting upon the needles of the front bank the pin 94' strikes the lug 106', returning rolls 17 and 18 to their initial position.

The mechanism for releasing the pawl 39 to permit the return of the rolls consists of a pawl-releasing bar 49, having the pin 47, which (by connection with the pattern mechanism to be hereinafter described) is moved forwardly just before the roll-returning mechanism is brought into action to disengage the pawl 39 from the ratchet on the roll-frame.

The mechanism for lifting the rocking lever 92 and its sleeve 93 to effect the return of the rolls is as follows: To one end of the bar 49 is pivoted a lever 107, pivoted between its ends to the machine-frame and pivoted at the other end to one end of a bar 108. The other end of this bar 108 is bifurcated, and the two forks are provided with cams 109 in alinement with pins 110 on the sleeve 112. This sleeve has a vertical movement on the post 90, but does not revolve thereon. The forks of bar 108 rest on washer 111, secured to post 90. When, as before stated, the bar 49 is moved laterally through its connection with the pattern mechanism to release pawl 39, it at the same time actuates lever 107, which in turn imparts a sliding movement to bar 108, causing the high part of cam 109 to ride under pin 110, thereby elevating the sleeve 112 and moving sleeve 93 and rocking lever 92 into operative position.

The pattern mechanism for lowering and raising the guard-lever 60 (and thereby controlling the mechanism for adding additional fashioning-needles) and for actuating the bar 49 (and thereby throwing into operation the mechanism for returning the rolls to their initial position) is specifically the same as that set out in my prior application and will now be described.

61 is a rocking lever on the shaft 62. Connected to one end of this rocking lever and to a crank 63 on the shaft 6 is a link 64, thereby giving to the rocking lever 61 a constantly-reciprocating motion.

65 is a rocking lever on the shaft 53, connected to the rocking lever 61 by means of the link 66, this rocking lever being thereby also constantly reciprocated.

67 is a pawl on the rocking lever 65, working in the ratchet-wheel 68 on the shaft 53. Connected to this ratchet-wheel is a sprocket-wheel 69, carrying the pattern-chain 70, having the lugs 71.

72 is the pattern-drum, having the ratchet 73, having the alternate long and short teeth.

74 is a pawl on the rocking lever 61.

75 is a pawl on one arm of the bell-crank 76, the other arm being in line with the lugs 71 on the pattern-chain. The pawl 74 on the constantly-reciprocating rocking lever 61 normally plays on one of the long teeth of the pattern-drum ratchet, the stroke not being sufficient to carry it beyond the long tooth. The pawl 75 is in engagement with the ratchet 73, but is normally inactive.

Arranged on the side of the pattern-drum, close to its periphery, is a series of pins which normally hold the guard-lever 60 in its elevated position.

When it is desired to drop the guard-lever 60 to throw into action the mechanism for adding additional fashioning-needles, it is necessary to rotate the pattern-drum a sufficient distance to allow the projection 89 on guard-lever 60 to drop back of the tooth upon which it has been resting. This is accomplished by the following operation of the mechanism just described: The bell-crank 76 is struck by one of the lugs 71 on the pattern-chain, rocking the bell-crank and advancing the pattern-drum by means of pawl 75 a sufficient distance to permit the pawl 74 in its next reciprocation to ride beyond and engage the long tooth upon which it has been playing, advancing the pattern-drum a distance sufficient to carry the pin $77^d$ from under the projection 89, permitting the guard-lever 60 to drop. At the next reciprocation of the pawl 74 it engages a short tooth, shifting the pattern-drum a sufficient distance to bring the first of the pins $77^a$ against and under the projection 89, lifting the guard-lever 60. The lever 60 remains in its elevated position until the next lug on the pattern-chain strikes the bell-crank 76, thereby again causing the drum to rotate and the guard-lever 60 to be raised and lowered, as before. The guard-lever 60 is thus intermittently raised and lowered at periods determined by the lugs on the pattern-chain until the projection 89 drops back of the last of the pins $77^a$. When projection 89 drops back of this pin, the turning of the pattern-drum by means of pawl 74 will not advance the drum a sufficient distance to cause the next succeeding pin $77^b$ to engage the projection 89. Until the next lug of the pattern-chain strikes the bell-crank 76 the guard-lever 60 will remain down, causing the rotation of the cam 51 to be repeated a predetermined number of times, thereby throwing in successively a predetermined number of additional fashioning-needles. When this next lug on the pattern-chain strikes the bell-crank 76, the pawls 75 and 74 will be operated, as before described, thereby rotating the drum to bring the first of the pins $77^b$ under the projection 89, lifting the guard-lever 60, thereby stopping the cam 51 when it has completed its revolution. The guard-lever is then intermittently raised and lowered at periods determined by the lugs on the pattern-chain until the projection 89 is raised by the first pin of series of pins $77^c$. All the fashioning-needles have now been thrown into action. The pins $77^c$ are sufficiently close together to prevent the projection 89 from dropping between them, and there are just a sufficient number of remaining lugs on the pattern-chain, arranged indifferently, to rotate the drum until the projection 89 drops back of the last pin of the series of pins $77^c$. From the time that the projection 89 has been raised by the first pin of the series of pins $77^c$ until it has dropped back of the last pin of the series all of the fashioning-needles are retained in action.

I provide the following mechanism for shifting the bar 49 in order to release the pawl 39 to throw into action the mechanism for returning the rolls, as before described. Just before the projection 89 drops back of the last pin of the series of pins 77ᶜ the cam projection 78 on the pattern-drum engages the crank 80. This crank is secured to the shaft 81, to which is secured the lever 82, connected to the bar 49. The engagement of cam projection 78 with crank 80 turns it, swinging the lever 82 and shifting the bar 49, which, as before described, disengages pawl 39 and throws into operation the mechanism for shifting the rolls longitudinally to their original position.

The knitting of one section of tubular fabric is now completed, and the knitting of the next section is at once commenced. The bar 49 is returned to its original position by the following means:

83 is a projection on the pattern-drum back of projection 78 and is provided with a cam-slot 84.

79 is a pin on crank 80 in line of travel of cam 84. As soon as the pattern-drum moves forward from its initial position the cam-slot 84 engages pin 79, returning crank 80 and lever 82 to their normal positions and shifting bar 49 back to its normal position, thereby throwing pawl 39 into engagement with the ratchet and allowing rocking lever 92 to drop.

The regular needles 12 only are in action in the knitting of the narrow fabric, during which the pattern-drum is rotated by means of lugs indifferently arranged on the pattern-chain until the projection 89 drops back of the last pin of the series of pins 77ᵈ, the operation then proceeding as before described.

It will be understood that either the lugs on the pattern-chain or the pins on the pattern-drum may be arranged in various ways to dictate the knitting of different styles of fashioned tubular goods and that by virtue of the employment of a pattern-drum in addition to the pattern-chain a comparatively short pattern-chain may be employed.

In Figs. 15, 16, and 17 I have shown a construction set out in my first application for acting upon the single needle which is elevated above the rest by means of the raised sections $a^{15}$ or $b^{14}$, so as to cause it to knit with the needles of the other bank. 19 19ᵃ 19ᵇ are the regular knitting-cams, secured to the cam-plate 9, the cam 19ᵇ being laterally slidable and being moved from left to right by the shanks of the needles striking it in the movement of the cam-plate from right to left. 19ᶜ is a latch or switch cam secured to the end of cam 19, this switch-cam dropping by gravity into the position shown in Fig. 15, so as to direct the needles over the cam 19 as the cam-plate moves from right to left. In the reverse movement of the cam-plate all the needles, except the one which it is desired shall knit with the opposite bank, are just high enough to engage the cam 19ᵃ, but not high enough to engage cam 19ᵈ. These needles therefore pass underneath cam 19ᵃ and are there rendered inactive. The needle of this bank which it is desired to throw into action is, however, raised just high enough to engage the edge of cam 19ᵈ and is thereby caused to be elevated along with the needles of the opposite bank, passing over cam 19ᵈ, shifting cam 19ᵇ from right to left, and passing underneath cam 19.

Having now fully described my invention, what I claim, and desire to protect by Letters Patent, is—

1. The combination, with the needles, of the rolls adjacent thereto, means enabling said rolls to actuate needles in alinement therewith, a shaft for rotating said rolls, a ratchet-wheel operatively connected with the roll-shaft, a pawl engaging said ratchet, a lock for the ratchet-wheel, means enabling the lock to lock the ratchet from turning in either direction, and means for reciprocating the pawl and for holding the lock out of its locking position until the completion of each forward movement of the ratchet.

2. The combination, with the needles, of the rolls adjacent thereto, means enabling said rolls to actuate needles in alinement therewith, a shaft for rotating said rolls, a ratchet-wheel, a locking-wheel connected thereto and rotating therewith, a lock adapted to engage the locking-wheel and lock it from turning in either direction, operative connections between the ratchet-wheel and the roll-shaft, a pawl engaging said ratchet, means to reciprocate the pawl, and means to cause said lock to move into locking engagement with the locking-wheel after each forward movement of the pawl.

3. The combination, with the needles, of the rolls adjacent thereto, means enabling said rolls to actuate needles in alinement therewith, a shaft for rotating said rolls, a ratchet-wheel, a locking-wheel connected thereto and rotating therewith, a lock adapted to engage the locking-wheel, operative connections between the ratchet-wheel and the roll-shaft, a pawl engaging said ratchet, a cam for lifting said lock out of engagement with said locking-wheel, and means to reciprocate said pawl and cam, whereby the cam is moved to disengage the lock from the locking-wheel during the withdrawal of the pawl, and whereby during the rocking forward of the ratchet-wheel by the pawl, the cam is moved to permit the lock to engage the locking-wheel.

4. The combination, with the needles, of the rolls adjacent thereto, means enabling said rolls to actuate needles in alinement therewith, a shaft for rotating said rolls, a ratchet-wheel, locking-wheel and gear-wheel connected and rotating together, gearing between the gear-wheel and the roll-shaft, a locking-dog for engaging the locking-wheel, a pawl for shifting the ratchet-wheel, a pawl-carrier, a cam for throwing the dog into and out of operative position, and means to reciprocate the pawl-carrier and cam in unison.

5. The combination, with the needles, of the rolls adjacent thereto, means enabling said rolls to actuate needles in alinement therewith, a shaft for rotating said rolls, a wheel provided with indents and operatively connected with the roll-shaft, a lock adapted to engage said wheel, a cam for throwing the lock into and out of operative position, means for simultaneously turning the wheel step by step and for reciprocating the cam, whereby during the turning of said wheel and during the movement of the cam in one direction the lock is brought into position to engage one of said detents, and whereby during the return movement of the cam and while the wheel is stationary the lock is withdrawn from said detent.

6. The combination, with the needles, of the rolls adjacent thereto, means enabling said rolls to actuate needles in alinement therewith, a shaft for rotating said rolls, a ratchet-wheel operatively connected with the roll-shaft, a pawl-carrier, a plurality of pawls carried thereby and engaging the ratchet, a driving-shaft, a cam on said shaft, a lever in line of travel of the cam, and a link connecting said lever and the pawl-carrier, a locking-wheel connected to and rotating with the ratchet-wheel, a locking-dog for engaging the locking-wheel, a cam for throwing the dog into and out of operative position, said cam being connected to said link.

7. The combination with the fashioning-needles, of a lever pivoted to the frame of the machine adapted to be reciprocated, mechanism actuated by the reciprocation of said lever to throw said needles into and out of operative position, means for imparting a reciprocating movement to said lever, a tension device tending to maintain said lever in engagement with its actuating means the pattern mechanism, and means actuated by the pattern mechanism to draw said lever out of engagement with its actuating means and hold it stationary against the action of said tension device.

8. The combination with the fashioning-needles, of rolls adjacent thereto, means enabling said rolls to actuate needles in alinement therewith, a lever pivoted to the frame of the machine adapted to be reciprocated, mechanism actuated by the reciprocation of said lever to impart to said rolls a step-by-step movement of rotation, means for imparting a reciprocating movement to said lever, a tension device tending to maintain said lever in engagement with its actuating means the pattern mechanism, and means actuated by the pattern mechanism to draw said lever out of engagement with its actuating means and hold it stationary against the action of said tension device.

9. The combination, with the fashioning-needles, of a driving-shaft, a cam thereon, mechanism in line of travel of said cam and adapted to be actuated thereby to throw said needles into and out of operative position, a tension device tending to maintain the needle-operating mechanism in engagement with said cam the pattern mechanism, and means actuated by the pattern mechanism to sever connection between said cam and the needle-operating mechanism.

10. The combination, with the fashioning-needles, of rolls adjacent thereto, means enabling said rolls to actuate needles in alinement therewith, a driving-shaft, a cam thereon, mechanism in line of travel of said cam and adapted to be reciprocated thereby to impart to said rolls a step-by-step movement of rotation, a tension device tending to maintain the needle-operating mechanism in engagement with said cam the pattern mechanism, and means actuated by the pattern mechanism to sever connection between said cam and the roll-actuating mechanism.

11. The combination with the fashioning-needles, of a driving-shaft, a cam thereon, a lever engaging said cam and adapted to be reciprocated thereby, mechanism actuated by the reciprocation of said lever to throw said needles into and out of operative position, a tension device tending to maintain said lever in engagement with said cam, the pattern mechanism, and means actuated by the pattern mechanism to draw said lever out of line of travel of said cam.

12. The combination, with the fashioning-needles, of rolls adjacent thereto, means enabling said rolls to actuate needles in alinement therewith, a driving-shaft, a cam thereon, a lever engaging said cam and adapted to be reciprocated thereby, mechanism actuated by the reciprocation of said lever to impart to said rolls a step-by-step movement of rotation, a tension device tending to maintain said lever in engagement with said cam, the pattern mechanism, and means actuated by the pattern mechanism to draw said lever out of line of travel of said cam.

13. The combination, with the fashioning-needles, of rolls adjacent thereto, means enabling said rolls to actuate needles in alinement therewith, a driving-shaft, a cam thereon, a lever engaging said cam and adapted to be reciprocated thereby, pawl-and-ratchet mechanism connected to and adapted to be operated by said lever and connected to and adapted to impart a step-by-step movement of rotation to said rolls, the pattern mechanism, and means actuated by the pattern mechanism to draw said lever out of line of travel of said cam.

14. The combination, with the needles, of the rolls adjacent thereto, means enabling said rolls to actuate needles in alinement therewith, a shaft for rotating said rolls, a ratchet-wheel operatively connected with the roll-shaft, a pawl engaging said ratchet, a lock for the ratchet-wheel, a cam for disengaging the connection between the lock and the ratchet-wheel, and means to reciprocate said pawl and cam, whereby the cam is moved to disengage the connection between the lock and ratchet-wheel during the withdrawal of the pawl and whereby during the rocking forward of the ratchet-wheel by the pawl, the cam is moved to cause the lock to lock the ratchet-wheel.

15. The combination, with the fashioning-needles, of rolls adjacent thereto, means enabling said rolls to actuate needles in alinement therewith, a driving-shaft, a cam thereon, a lever engaging said cam and adapted to be reciprocated thereby, pawl-and-ratchet mechanism connected to and adapted to be operated by said lever and connected to and adapted to impart a step-by-step movement of rotation to said rolls, and a lock in connection with said lever and adapted to limit the throw of the ratchet mechanism, the pattern mechanism, and means actuated by the pattern mechanism to draw said lever out of line of travel of said cam.

16. The combination, with the fashioning-needles, of rolls adjacent thereto, means enabling said rolls to actuate needles in alinement therewith, a driving-shaft, a cam thereon, a lever engaging said cam, and adapted to be reciprocated thereby, pawl-and-ratchet mechanism connected to and adapted to be operated by said lever and connected to and adapted to impart a step-by-step movement of rotation to said rolls, a lock adapted to limit the throw of the ratchet mechanism, and a cam connected with said lever and adapted to throw said lock into and out of operative position.

17. The combination, with the fashioning-needles, of rolls adjacent thereto, means enabling said rolls to actuate needles in alinement therewith, a driving-shaft, a cam thereon, a lever engaging said cam, and adapted to be reciprocated thereby, pawl-and-ratchet mechanism connected to and adapted to be operated by said lever and connected to and adapted to impart a step-by-step movement of rotation to said rolls, a lock adapted to limit the throw of the ratchet mechanism, and a cam connected with said lever and adapted to throw said lock into and out of operative position, the pattern mechanism, and means actuated by the pattern mechanism to draw said lever out of line of travel of said cam.

18. The combination, with the fashioning-needles, of a driving-shaft, a cam thereon, a lever in line of travel of said cam and adapted to be reciprocated thereby, a ratchet, a lock adapted to limit the throw of the ratchet, a pawl, a pawl-carrier connected with said lever, a cam for moving said lock into and out of operative position also connected with said lever, and mechanism actuated by the turning of said ratchet to operate said needles.

19. The combination, with the fashioning-needles, of a driving-shaft, a cam thereon, a lever in line of travel of said cam and adapted to be reciprocated thereby, a ratchet, a lock therefor, a pawl, a pawl-carrier connected with said lever, a cam for moving said lock into and out of operative position also connected with said lever, and mechanism actuated by the turning of said ratchet to operate said needles, the pattern mechanism, and means actuated by the pattern mechanism to draw said lever out of line of travel of said cam.

20. The combination, with the needles, the needle-controlling rolls adjacent thereto and means enabling said rolls to actuate needles in alinement therewith, of a frame in which said rolls are journaled, a driving-shaft, a cam thereon, a reciprocating device actuated by said cam, the pattern mechanism, means actuated by the pattern mechanism to disengage the cam and the device actuated thereby, and roll-turning and roll-shifting mechanism adapted to be actuated by said reciprocating device.

21. The combination with the needles, the needle-controlling rolls adjacent thereto and means enabling said rolls to actuate needles in alinement therewith, of a frame in which said rolls are journaled, a driving-shaft, a cam thereon, a reciprocating device actuated by said cam, the pattern mechanism, means actuated by the pattern mechanism to disengage the cam and the device actuated thereby, roll-turning mechanism adapted to be actuated by said reciprocating device, and roll-shifting mechanism, adapted to be actuated by the roll-turning mechanism.

22. The combination, with the needles, of rolls adjacent thereto, means enabling said rolls to actuate needles in alinement therewith, means for shifting said rolls step by step longitudinally in one direction, means for positively shifting said rolls longitudinally in the opposite direction, the pattern mechanism, and means actuated by the pattern mechanism to move the last-named roll-shifting means into operative position.

23. The combination, with the needles, of rolls adjacent thereto, means enabling said rolls to actuate needles in alinement therewith, means for shifting said rolls step by step longitudinally in one direction, a constantly-reciprocating device normally out of alinement with said rolls but adapted to be moved into alinement therewith and shift the same to their original position, the pattern mechanism, and means actuated by the pattern mechanism to move the constantly-reciprocating device into alinement with the rolls.

24. The combination, with the needles, of rolls adjacent thereto, means enabling said rolls to actuate needles in alinement therewith, means for shifting said rolls step by step longitudinally in one direction, a constantly-reciprocating device normally inoperative but adapted to be moved into position to shift the rolls to their original position, the pattern mechanism, and means actuated by the pattern mechanism to move the constantly-reciprocating device into operative position.

25. The combination, with the needles, of rolls adjacent thereto, means enabling said rolls to actuate needles in alinement therewith, devices for shifting the rolls step by step longitudinally in one direction, means for operating said devices, a constantly-reciprocating device normally inoperative but adapted to be moved into position to shift the rolls to their original position, the pattern mechanism, means actuated by the pattern mechanism to sever connection between the devices for shifting the rolls forwardly and their operating means, and means actuated by the pattern mechanism to move the constantly-reciprocating device into operative position.

26. The combination, with the needles, of rolls adjacent thereto, means enabling said rolls to actuate needles in alinement therewith, means for shifting the rolls step by step longitudinally in one direction, a constantly-reciprocating rocking lever normally out of line of travel of the rolls but adapted when moved into alinement therewith to shift the same to their original position, and means for moving the rocking lever into alinement with the rolls.

27. The combination, with the front and rear banks of needles, of rolls adjacent thereto, means enabling said rolls to independently actuate the needles of both banks, means for shifting the rolls step by step longitudinally in one direction, a constantly-reciprocating intermediately-pivoted lever adapted to be moved into such position that the opposite ends thereof will be in alinement with the rolls for the front and rear banks of needles respectively and successively shift said front and rear rolls to their original position, and means for moving said rocking lever into said position.

28. The combination with the needles, of rolls adjacent thereto, means enabling said rolls to actuate needles in alinement therewith, means for shifting the rolls step by step longitudinally in one direction, a constantly-reciprocating rocking lever normally out of line of travel of the rolls but adapted when moved into alinement therewith to shift the same to their original position, a post on which said rocking lever is sleeved, a sliding rod having a cam, pins in connection with the sleeve of the rocking lever in line of travel of said cam, and means for operating said rod.

29. The combination, with the needles, of rolls adjacent thereto, means enabling said rolls to actuate needles in alinement therewith, means for shifting the rolls forwardly step by step longitudinally in one direction, a rocking lever, a post on which said rocking lever is sleeved, a connecting-rod connected to the sleeve of the rocking lever by means of a universal joint, a crank to which the connecting-rod is pivoted, means for operating the crank, and means for moving said rocking lever on its post into alinement with the rolls whereby the same will be shifted to their initial position.

30. The combination, with the needles, of rolls adjacent thereto, means enabling said rolls to actuate needles in alinement therewith, means for shifting the rolls forwardly step by step longitudinally in one direction, a rocking lever, a post on which said rocking lever is sleeved, a connecting-rod connected to the sleeve of the rocking lever by means of a universal joint, a crank to which the connecting-rod is pivoted, means for operating the crank, a sliding rod having a cam, pins in connection with the sleeve of the rocking lever in line of travel of said cam, and means for operating said rod, thereby moving said rocking lever on its post into alinement with the rolls whereby the same will be shifted to their initial position.

31. The combination, with the needles, of rolls adjacent thereto, means enabling said rolls to actuate needles in alinement therewith, a sliding frame in which said rolls are journaled, a rack on said frame, a pawl engaging said rack, means for actuating said pawl whereby the rolls are shifted forwardly step by step, a device for shifting the rolls to their initial position, a device for disengaging said pawl to permit the return of the rolls, the pattern mechanism, and means connected to the pawl-disengaging device and the roll-returning device and actuated by the pattern mechanism to throw said devices successively into operation.

32. The combination, with the needles, of rolls adjacent thereto, means enabling said rolls to actuate needles in alinement therewith, a sliding frame in which said rolls are journaled, a rack on said frame, a pawl engaging said rack, means for actuating said pawl whereby the rolls are shifted forwardly step by step, a device for shifting the rolls to their initial position, a device for disengaging said pawl to permit the return of the rolls, the pattern mechanism, means actuated by the pattern mechanism to move said pawl-actuating means into and out of action, and means connected to the pawl-disengaging device and the roll-returning device and actuated by the pattern mechanism to throw said devices successively into operation.

33. The combination, with the needles, of rolls adjacent thereto, means enabling said rolls to actuate needles in alinement therewith, a sliding frame in which said rolls are journaled, a rack on said frame, a pawl engaging said rack, means for actuating said pawl whereby the rolls are shifted forwardly step by step, a device for shifting the rolls to their initial position, a device for disengaging said pawl to permit the return of the rolls, connected to and adapted to actuate the roll-returning device, the pattern mechanism and means actuated thereby connected to and adapted to operate the pawl-disengaging device.

34. The combination with the needles, of rolls adjacent thereto, means enabling said rolls to actuate needles in alinement therewith, devices for shifting the rolls step by step longitudinally in one direction, means for operating said devices, a constantly-reciprocating device normally inoperative but adapted to be moved into position to shift the rolls to their original position, a device for disengaging the step-by-step roll-shifting devices from the rolls, the pattern mechanism, means actuated by the pattern mechanism to sever connection between the step-by-step roll-shifting devices and their operating means, means actuated by the pattern mechanism to operate the roll-shifting disengaging device, and means actuated by the pattern mechanism to move the constantly-reciprocating device into operative position.

35. The combination, with the needles, of rolls adjacent thereto, means enabling said rolls to actuate needles in alinement therewith, a sliding frame in which said rolls are journaled, a rack on said frame, a pawl engaging said rack, devices for actuating said pawl whereby the rolls are shifted step by step longitudinally in one direction, means for operating said devices, a constantly-reciprocating device normally inoperative but adapted to be moved into position to shift the rolls to their initial position, a device for disengaging said pawl to permit the return of the rolls, the pattern mechanism, means actuated by the pattern mechanism to sever connection between the devices for shifting the rolls forwardly and their actuating means, and means actuated by the pattern mechanism to operate the pawl-disengaging device and move the constantly-reciprocated device into operative position.

36. The combination, with the needles, of rolls adjacent thereto, means enabling the rolls to actuate needles in alinement therewith, a frame on which said rolls are journaled, means for shifting the roll-frame step by step longitudinally in one direction, a device for disengaging the roll-frame and its operating means to permit the return of the rolls, a roll-returning device connected to and operated by the disengaging device to shift the rolls to their initial position, and means for operating said disengaging device.

37. The combination, with the needles, of rolls adjacent thereto, means enabling the rolls to actuate needles in alinement therewith, a frame on which said rolls are journaled, means for shifting the roll-frame step by step longitudinally in one direction, a device for disengaging the roll-frame and its operating means to permit the return of the rolls, a constantly-reciprocating device normally inoperative but adapted to be moved into position to shift the rolls to their initial position, and means for operating the disengaging device and for moving the constantly-reciprocating device into operative position.

38. The combination, with the needles, of rolls adjacent thereto, means enabling the rolls to actuate needles in alinement therewith, roll-turning and roll-shifting mechanism, operating means for the latter, a constantly-reciprocating device for shifting the rolls back but normally inoperative, the pattern mechanism, means actuated by the pattern mechanism to disengage the roll-shifting and roll-turning mechanism from their operating means, and means actuated by the pattern mechanism to move said constantly-reciprocating device into operative position.

39. The combination, with the needles, of rolls adjacent thereto, means enabling the rolls to actuate needles in alinement therewith, roll-operating mechanism, a lever for disengaging the roll-operating mechanism from its operative means, a cam having a concentric portion and a high point, said lever being in line of movement of said cam, a ratchet for rotating said cam, a pawl adapted to be reciprocated and to engage said ratchet, a guard-lever adapted to guard said pawl from engaging said ratchet, and pattern mechanism adapted to move said guard-lever to permit said pawl to actuate said ratchet and rotate said cam to move said high point into engagement with said lever, thereby actuating said lever and disengaging the roll-operating mechanism from its operative means.

40. The combination, with the pattern-drum, the needles, the rolls for moving the needles into and out of operative position, a frame in which the rolls are journaled, a ratchet on said frame, a pawl for shifting said frame, longitudinally step by step in one direction and for holding said frame in its shifted position, mechanism controlled by the pattern-drum for actuating said pawl, devices controlled by the pattern-drum for disengaging said pawl from the rack, and a device carried by the pattern-drum to actuate said pawl-disengaging devices at a predetermined point in the rotation of said drum, means for returning the roll-frame to its initial position after the disengagement of said pawl, a cam on the pattern-drum in alinement with said pawl-disengaging devices for returning the same to their normal positions, and means for rotating said pattern-drum.

41. A pattern-roll consisting of two cylindrical ends of different diameters, and a collar provided with projections and depressions surrounding the part of lesser diameter and adjacent to the part of greater diameter.

42. A pattern-roll consisting of two cylindrical ends of different diameters, and a collar provided with projections surrounding the part of lesser diameter, the part of lesser diameter being provided with a projection in alinement with the periphery of the part of greater diameter.

43. A pattern-roll consisting of two cylindrical ends of different diameters, and a collar provided with projections surrounding the part of less diameter, the part of greater diameter being provided with a groove in alinement with the periphery of the part of lesser diameter.

In testimony of which invention I have hereunto set my hand, at Philadelphia, Pennsylvania, on this 2d day of July, 1900.

HARRY A. HOUSEMAN.

Witnesses:
M. F. ELLIS,
J. M. SHINDLER, Jr.